US010534912B1

(12) United States Patent
Youngberg

(10) Patent No.: US 10,534,912 B1
(45) Date of Patent: Jan. 14, 2020

(54) METHODS AND SYSTEMS FOR MULTI-TOOL ORCHESTRATION

(71) Applicant: Capital One Services, LLC, McLean, VA (US)

(72) Inventor: Adam Youngberg, Allen, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/177,178

(22) Filed: Oct. 31, 2018

(51) Int. Cl.
*G06F 21/55* (2013.01)
*G06F 21/56* (2013.01)
*G06F 21/57* (2013.01)
*G06F 9/445* (2018.01)
*G06F 21/10* (2013.01)
*G06F 9/52* (2006.01)
*G06F 11/36* (2006.01)

(52) U.S. Cl.
CPC ........ *G06F 21/554* (2013.01); *G06F 9/44536* (2013.01); *G06F 21/105* (2013.01); *G06F 21/562* (2013.01); *G06F 21/563* (2013.01); *G06F 21/566* (2013.01); *G06F 21/577* (2013.01); *G06F 9/52* (2013.01); *G06F 11/3604* (2013.01); *G06F 2221/033* (2013.01)

(58) Field of Classification Search
CPC .... G06F 21/562; G06F 21/105; G06F 21/566; G06F 2221/033; G06F 11/3604
See application file for complete search history.

(56) References Cited

U.S. PATENT DOCUMENTS 6,944,775 B2 * 9/2005 Barton .................. G06F 21/562
713/188
7,207,065 B2 * 4/2007 Chess ................... G06F 21/577
726/22

(Continued)

FOREIGN PATENT DOCUMENTS

WO 2016018289 A1 2/2016

OTHER PUBLICATIONS

Codeburner—One static analysis tool to rule them all; http://groupon.github.io/codeburner/; Apr. 21, 2016 (Year: 2016).*

(Continued)

*Primary Examiner* — James R Turchen
(74) *Attorney, Agent, or Firm* — Troutman Sanders LLP; Christopher J. Forstner; John A. Morrissett

(57) ABSTRACT

A system for performing code security scan includes a non-transitory computer readable medium and a processor. The non-transitory computer readable medium stores a plurality of identifiers each identifying a software security analysis tool of one of several categories, including SAST, DAST and OSA tools. The processor receives an identification of code to be scanned. The processor selects at least two identifiers from the plurality of identifiers. The at least two identifiers identify at least two select software security analysis tools for execution on the identified code. The processor receives an execution result from each select software security analysis tool after performing execution on the identified code. The processor aggregates the execution result from each select software security analysis tool. A user interface displays an aggregation of the execution result from each select software security analysis tool.

19 Claims, 8 Drawing Sheets

(56) References Cited

U.S. PATENT DOCUMENTS

| | | | | |
|---|---|---|---|---|
| 8,661,547 | B1* | 2/2014 | Kononov | G06F 21/577 726/24 |
| 9,208,312 | B2* | 12/2015 | Wiseman | G06F 21/56 |
| 9,418,230 | B2* | 8/2016 | Archer | G06F 21/577 |
| 9,501,345 | B1* | 11/2016 | Lietz | G06F 11/0784 |
| 9,544,327 | B1* | 1/2017 | Sharma | H04L 63/1433 |
| 9,633,182 | B2* | 4/2017 | Scapa | G06F 21/10 |
| 9,749,349 | B1* | 8/2017 | Czarny | H04L 63/1433 |
| 9,846,781 | B2* | 12/2017 | Kejriwal | G06F 21/577 |
| 9,996,693 | B2* | 6/2018 | Sun | G06F 21/566 |
| 2003/0051154 | A1* | 3/2003 | Barton | G06F 21/562 726/4 |
| 2008/0235141 | A1* | 9/2008 | Hilerio | G06F 21/105 705/59 |
| 2009/0044024 | A1* | 2/2009 | Oberheide | G06F 21/562 713/188 |
| 2009/0249488 | A1* | 10/2009 | Robinson | G06F 21/10 726/26 |
| 2010/0083240 | A1* | 4/2010 | Siman | G06F 8/433 717/144 |
| 2010/0218256 | A1* | 8/2010 | Thomas | G06F 21/552 726/25 |
| 2010/0281248 | A1* | 11/2010 | Lockhart | G06F 11/3612 713/150 |
| 2010/0333069 | A1* | 12/2010 | Chandra | G06F 8/75 717/126 |
| 2011/0231361 | A1* | 9/2011 | Patchava | G06F 21/50 707/602 |
| 2012/0054857 | A1* | 3/2012 | Bisso | G06F 21/56 726/22 |
| 2012/0084859 | A1* | 4/2012 | Radinsky | G06F 21/56 726/23 |
| 2013/0097701 | A1* | 4/2013 | Moyle | G06F 21/552 726/22 |
| 2013/0227695 | A1* | 8/2013 | Shenker | G06F 21/577 726/25 |
| 2013/0247167 | A1* | 9/2013 | Paul | H04L 63/20 726/11 |
| 2013/0312102 | A1* | 11/2013 | Brake | G06F 21/577 726/25 |
| 2014/0181975 | A1* | 6/2014 | Spernow | G06F 21/562 726/23 |
| 2014/0304818 | A1* | 10/2014 | Li | G06F 21/568 726/24 |
| 2014/0337982 | A1* | 11/2014 | Crosby | H04L 63/1433 726/25 |
| 2015/0020203 | A1* | 1/2015 | Xie | G06F 21/56 726/24 |
| 2015/0052606 | A1* | 2/2015 | Romero Bueno | H04L 63/1425 726/23 |
| 2015/0096036 | A1* | 4/2015 | Beskrovny | G06F 21/577 726/25 |
| 2015/0113332 | A1* | 4/2015 | Fu | G06F 8/75 714/38.1 |
| 2015/0180883 | A1* | 6/2015 | Aktas | H04L 63/145 726/23 |
| 2015/0237063 | A1* | 8/2015 | Cotton | H04L 63/1433 726/25 |
| 2015/0244737 | A1* | 8/2015 | Siman | G06F 21/51 726/23 |
| 2015/0356280 | A1* | 12/2015 | Lori | G06F 21/105 726/26 |
| 2016/0092185 | A1* | 3/2016 | Botti | G06F 8/60 717/103 |
| 2016/0202972 | A1* | 7/2016 | Sass | G06F 8/751 717/121 |
| 2016/0275116 | A1* | 9/2016 | Shi | G06F 8/75 |
| 2016/0292066 | A1* | 10/2016 | Stevens | G06F 11/3624 |
| 2017/0212829 | A1* | 7/2017 | Bales | G06F 11/3664 |
| 2017/0249143 | A1* | 8/2017 | Sass | G06F 8/36 |
| 2019/0005206 | A1* | 1/2019 | Sahoo | G06F 21/105 |
| 2019/0114435 | A1* | 4/2019 | Bhalla | G06F 21/55 |

OTHER PUBLICATIONS

SCALe: A Tool for Managing Output from Static Analysis Tools; https://insights.sei.cmu.edu/sei_blog/2018/09/scale-a-tool-for-managing-output-from-static-code-analyzers.html; Sep. 24, 2018 (Year: 2018).*

* cited by examiner

| API REFERENCE | Static Assessment | RESPONSE SAMPLE |
|---|---|---|
| Application | [POST] /assessment/static | { |
| Beta | | "code": 200, |
| Component | This endpoint receives output from a build process (e.g. Jenkins automation server). Required inputs include a dependency-resolved code archive and the name of the registered component to assess. A successful POST will initiate both static and composition code scans by default. | "message": "success" |
| Deprecated | | } |
| Devops | | |
| Static Assessment | Please allow sufficient time for the scan to start: for large code archives, the request may take over 5 minutes to complete | RESPONSE SCHEMA |
| Enroll | | [ ] Success |
| Reports | Parameters | |
| | | code [integer] — HTTP response code (e.g. 200 OK, 403 Forbidden, 503 Service Unavailable). The overall request will return a 200 response, but this code should be used to determine the request status. |
| API | componentNa... [(required)] [string] Component name as registed in the application | |
| Bake security into your build process. | | message [string] — Human-readable response text, corresponding to the provided "code". For error responses, use this field to troubleshoot and resubmit. |
| *Return to Home* | codeArchive [Browse...] [No file selected.] [file] Zipped archive of code with resolved dependencies - file should be in .zip format | |
| Contact | | fields (optional) [string] — Present for unsuccessful responses. Indicates which fields were invalid and may contain multiple errors. The position of the field and the "message" response parameter correspond to one another. |
| Email address | | |
| BASE URL: /api API VERSION: 1.0 | staticOnly [▼] [boolean] To run only a static scan, optionally set this parameter to [true]. Note: if specified, either [staticOnly] OR [compositionOnly] must be true. | |
| | compositionO... [▼] [boolean] To run only a composition scan, optionally set this parameter to [true] Note: if specified, either [staticOnly] OR [compositionOnly] must be true. | |
| | Test this endpoint [TRY] | |

METHODS AND SYSTEMS FOR MULTI-TOOL ORCHESTRATION

CROSS REFERENCE TO RELATED APPLICATIONS

This disclosure incorporates by reference U.S. patent application Ser. No. 16/177,236, filed Oct. 31, 2018, entitled "Methods and Systems for Reducing False Positive Findings", U.S. patent application Ser. No. 16/177,275, filed Oct. 31, 2018, entitled "Methods and Systems for Determining Software Risk Scores," U.S. patent application Ser. No. 16/177,299, filed Oct. 31, 2018, entitled "Methods and Systems for De-duplication of Findings," the contents of which are incorporated by reference herein as if they were restated in full.

FIELD

The presently disclosed subject matter relates generally to orchestrating multiple software security analysis tools, more particularly, to systems and methods implementing an orchestration or abstraction layer to trigger and monitor scan activities, and receive scan results of multiple software security analysis tools.

BACKGROUND

Some existing tools provide a mechanism to retrieve scan results from software security testing tools, but do not have the ability to start scan activity or monitor the scan activity throughout the scan process. When multiple security testing tools are needed to perform scans, a user often became frustrated with the lack of orchestration of these tools. For instance, there is a lack of an intelligent mechanism integrating and updating scan results obtained from different, independent, third party tools. The user had to separately manage each of these tools. As a result, the user had to spend most of time running tools, leaving a limited amount of time to interpret scan results.

In view of the foregoing, a need exists for an orchestration solution that automatically orchestrates multiple software security analysis tools, such as selectively activates and monitors their scans, receives scan results, aggregates and updates scan results, and provides easy visualization of the aggregate scan results. Embodiments of the present disclosure are directed to this and other considerations.

SUMMARY

Aspects of the disclosed technology include systems and methods for performing or orchestrating a code security scan. Consistent with the disclosed embodiments, a system includes a non-transitory computer readable medium and a processor. The non-transitory computer readable medium stores a plurality of identifiers each identifying a software security analysis tool of one of the following categories: a first category of at least one software security analysis tool for performing Static Application Security Testing (SAST), a second category of at least one software security analysis tool for performing Dynamic Application Security Testing (DAST); and a third category of at least one software security analysis tool for performing Open Source Analysis (OSA). The processor receives an identification of code to be scanned. The processor selects at least two identifiers from the plurality of identifiers. The at least two identifiers identify at least two select software security analysis tools for execution on the identified code. The processor receives an execution result from each select software security analysis tool after performing execution on the identified code. The processor aggregates the execution result from each select software security analysis tool. The processor displays, in a user interface, an aggregation of the execution result from each select software security analysis tool.

Another aspect of the disclosed technology relates to a multi-tool security analysis system that includes one or more processors. The system also includes a memory in communication with the one or more processors and storing instructions. When executed by the one or more processors, the stored instructions are configured to cause the system to receive, from a host server via a real-time API, an analysis request comprising a software code identifier for software code to be analyzed and identification of two or more analysis tools comprising one or more SAST tools, one or more DAST tools, and one or more OSA tools. The analysis tools are presented on a multi-tool security analysis website associated with the host server. Responsive to the analysis request, the system activates execution of the two or more identified analysis tools to analyze the software code. The system aggregates an analysis output from each of the two or more identified analysis tools to create an aggregate result. The system provides, to the host server via the real-time API, the aggregate result for presentation on the multi-tool security analysis website.

A further aspect of the disclosed technology relates to a multi-tool security analysis system that includes one or more processors, and a memory in communication with the one or more processors and storing instructions. When executed by the one or more processors, the stored instructions are configured to cause the system to receive an analysis request comprising a software code identifier for software code to be analyzed and a user-selection of two or more analysis tools comprising one or more SAST tools, one or more DAST tools, and one or more OSA tools. The analysis tools are presented on a multi-tool security analysis website. Responsive to receiving the analysis request, the system directs the two or more identified analysis tools to analyze the software code. The system aggregates a vendor-specific output from each of the two or more identified analysis tools to create an aggregate result. The system provides the aggregate result for presentation on the multi-tool security analysis website.

Consistent with the disclosed embodiments, methods for performing orchestration on multiple software security analysis tools are disclosed.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings:

FIG. 6 is an example screenshot of a graphical user interface of the orchestration system according to one aspect of the disclosed technology.

FIG. 7 is another example screenshot of the graphical user interface of the orchestration system according to one aspect of the disclosed technology.

FIG. 8 is an additional example screenshot of the graphical user interface of the orchestration system according to one aspect of the disclosed technology.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
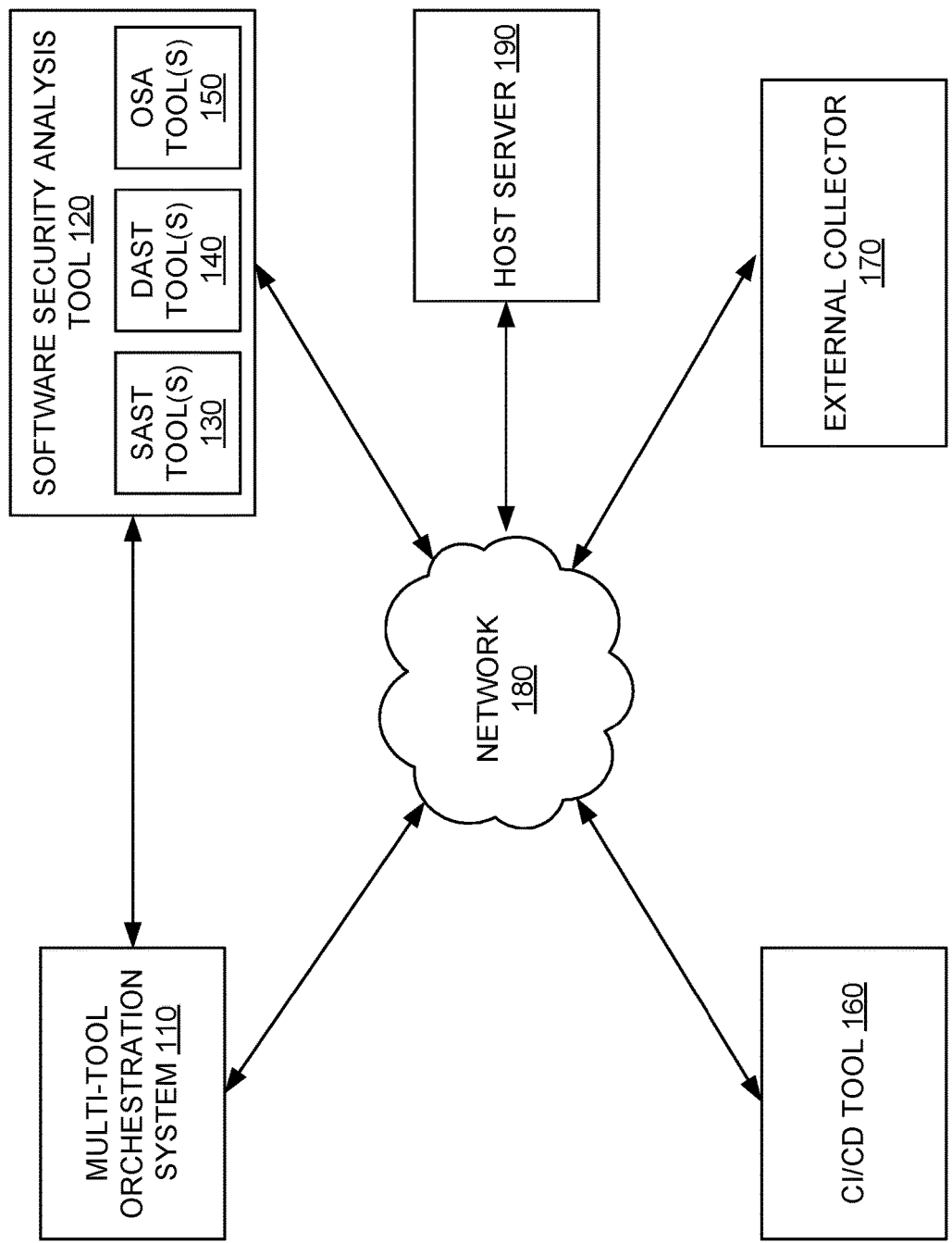
FIG. 1 is a diagram of an example environment that may be used to implement one or more embodiments of the present disclosure.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 may include one or more of the following: one or more multi-tool orchestration systems 110, one or more software security analysis tools 120, one or more continuous integration, continuous delivery (CI/CD) tools 160, one or more external collectors 170, one or more networks 180, and one or more host servers 190.

The orchestration system 110 may act as an orchestration or abstraction layer for the software security analysis tools 120. The orchestration system 110 may interface with and collect information from various software security analysis tools 120 behind scenes. Acting as an abstraction layer on top of underlying interfaces for each software security analysis tool 120, the orchestration system 110 presents a simplified solution to orchestrate scan activities, track scan activity, and review results once scans are completed.

The software security analysis tools 120 may include one or more categories, such as a first category of one or more static application security testing (SAST) tools 130, a second category of one or more dynamic application security testing (DAST) tools 140, and a third category of one or more open source analysis (OSA) tools 150, among other possibilities.

Each software security analysis tool 120 of the first, second and third categories may be a standalone solution, a network-based client-server solution, a web-based solution, or a cloud-based solution, among other possibilities. Each software security analysis tool 120 may be provided by a different third party licensor or vendor, and thus each may be independent of each other. The SAST tools 130 may include Checkmarx™ and Fortify™, among other possibilities. The DAST tools 140 may include WebInspect™ and Contrast™, among other possibilities. The OSA tools 150 may include Whitesource™ and Blackduck™, among other possibilities.

The orchestration system 110 may orchestrate the multiple software security analysis tools 120 by selectively activating their scan functions, monitoring or tracking their scan activities throughout scan processes, and reviewing scan results once scans are completed.

Figure 2:
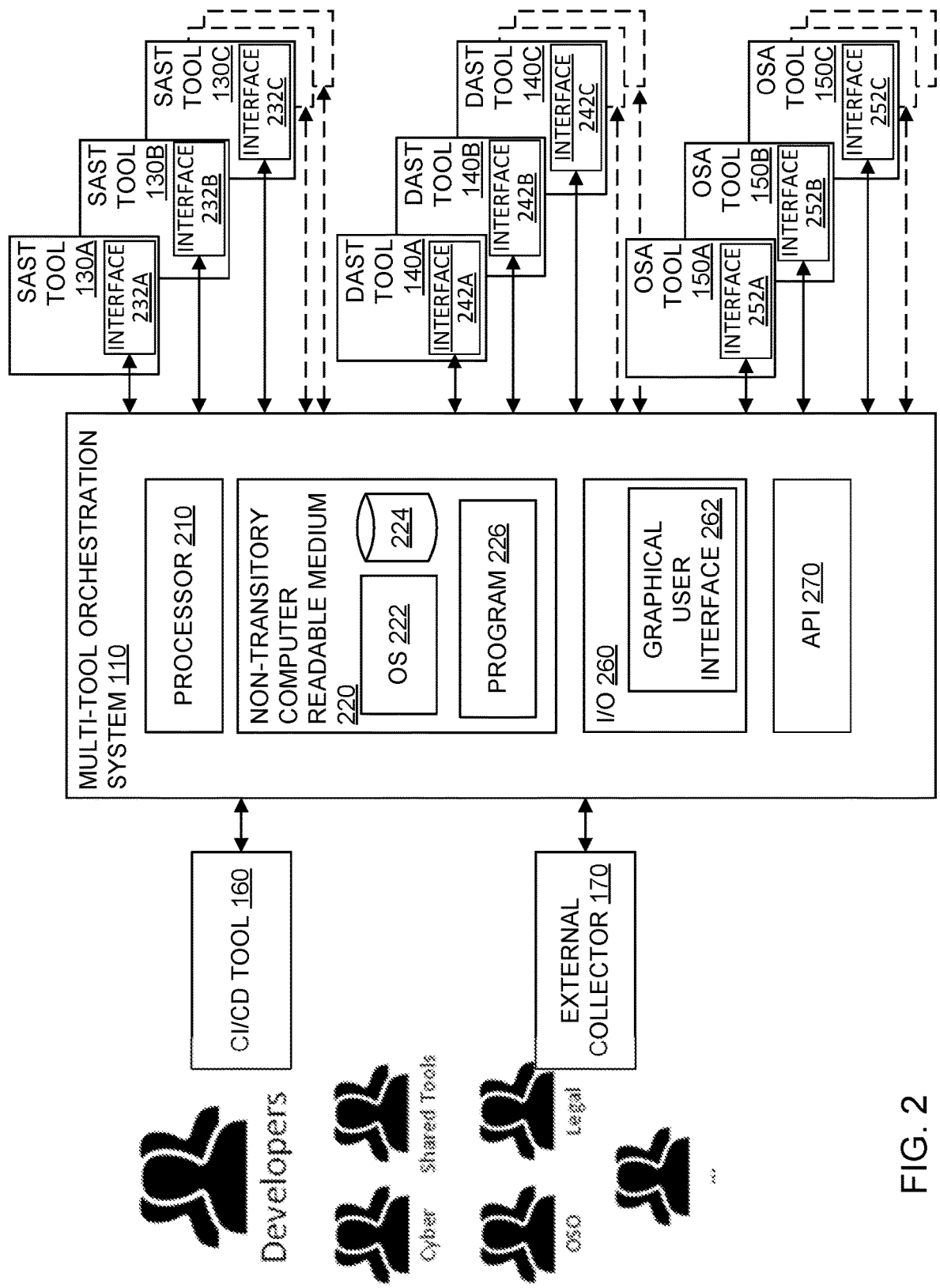
FIG. 2 is an example block diagram illustrating communications between a multi-tool orchestration system and multiple software security analysis tools according to one aspect of the disclosed technology.

Turning to FIG. 2, various users or interest groups, such as developers, lines of business, and executive stakeholders may use the orchestration system 110 to run multiple security backends on submitted code, including but not limited to, one or more SAST tools 130A-130C, one or more DAST tools 140A-140C, one or more OSA tools 150A-150C, among other possibilities.

Each tool may have a different interface or protocol. For example, SAST tools 130A-C, DAST tools 140A-C, and OSA tools 150A-C may have interfaces 232A-C, 242A-C and 252A-C, respectively. These tools may have different types of interfaces, including RESTful API, SOAP API, and a command line utility among other possibilities. Traditionally, a user needs to learn protocols of each tool. For instance, in a situation where a first tool has a RESTful API, a second tool has a SOAP API, and a third tool does not have an API but has a command line utility, the user needs to learn how to construct appropriate requests or parameters to execute each tool. With the orchestration system 110 of the example embodiments, the user is no longer involved with constructing requests or parameters required by the individual protocols of each tool.

The orchestration system 110 may serve as a single interface or a single end-point between the user and software security analysis tools 120. By serving as a single interface to access scan results of software security analysis tool 120, the orchestration system 110 may reduce complexity of integration and provide consistency when the user reviews scan results. By dealing with the orchestration system 110 alone, the user does not need to learn protocols of each software security analysis tool 120 and does not need to deal with separate interfaces such as APIs or command lines.

The orchestration system 110 may include one or more of the following: a processor 210, a non-transitory computer readable medium 220, an input/output ("I/O") device 260, and an application program interface (API) 270, among other possibilities. The I/O device 260 may include a graphical user interface 262.

The non-transitory computer readable medium 220 may store a plurality of identifiers. Each identifier may identify a software security analysis tool 120 orchestrated by the orchestration system 110. For example, the non-transitory computer readable medium 220 may store identifiers that identify each of SAST tools 130A-C, DAST tools 140A-C and OSA tools 150A-C. The non-transitory computer readable medium 220 may store information of historical scan activities performed by each software security analysis tool 120. The historical scan activities may be displayed in the graphical user interface 262 upon request. The non-transitory computer readable medium 220 may store status information of execution progress of each software security analysis tool 120. The execution progress of each software security analysis tool 120 may be displayed in the graphical user interface 262 upon request. The status information may include one of the following: completed, in progress and queued.

In some example embodiments, the orchestration system 110 does not rely on or expressly adopt any given taxonomy. For example, orchestration system 110 does not rely on common weakness enumeration (CWE) or vendor-established taxonomies. Instead, an example orchestration system 110 may have a unique internal taxonomy that reconciles scan results or findings generated by different software security analysis tools 120.

The orchestration system 110 may initiate scan activities on multiple software security analysis tools 120, and monitor scan activities performed by each tool from start to completion. As each software security analysis tool 120 completes its scan activity, the orchestration system 110 may receive its scan results, store the received scan results in the non-transitory computer readable medium 220, and wait for remaining software security analysis tools 120 to complete scans. The non-transitory computer readable medium 220 may store historical information associated with scan activity performed by each software security analysis tool 120, including but not limited to historical scan results.

The orchestration system 110 may aggregate or integrate scan results or findings provided by software security analysis tools 120 into a meaningful singular result, regardless of whether the software security analysis tools 120 are of the same or different categories. For example, the orchestration system 110 may orchestrate one or more SAST tools 130A-B and/or one or more DAST tools 140A-B, and aggregate their scan results into a single interface. The orchestration system 110 may bring together the scan results or findings, analyze them for common elements, and match them against an internally developed taxonomy. Each scan result or finding may be identified by a fingerprint. The orchestration system 110 may identify identical or similar findings by comparing their fingerprints. The algorithm may tolerate dissimilarities between scan results or findings, such as a change in line number of a particular finding.

The orchestration system 110 may consider historical scan activities. As the orchestration system 110 receives scan results from each software security analysis tool 120, the orchestration system 110 may update the aggregate scan result and provide an updated result as each scan is completed.

The orchestration system 110 may trigger multiple software security analysis tools 120 of the same category to start scan simultaneously or at predetermined timestamps. For example, the orchestration system 110 may instruct multiple SAST tools 130A-C to perform scans simultaneously or at predetermined timestamps. In one embodiment, for example, SAST tool 130A may be Checkmarx™, and SAST tool 130B may be Fortify™.

Also, the orchestration system 110 may trigger one or more software security analysis tools 120 of different categories to start scan simultaneously or at predetermined timestamps. For example, the orchestration system 110 may instruct multiple SAST tools 130A-B, and multiple OSA tools 150A-B to perform scan simultaneously or at predetermined timestamps. In some embodiments, for example, SAST tool 130A may be Checkmarx™, and SAST tool 130B may be Fortify™, while OSA tool 150A may be Whitesource™, and OSA tool 150B may be Blackduck™.

In one scenario, SAST tool 130A reports a scan result to the orchestration system 110, identifying an issue that may need to be resolved. To validate whether the issue has been resolved, the orchestration system 110 may not need to request the SAST tool 130A to perform the scan for a second time. Instead, the orchestration system 110 may wait for remaining tools to complete their scans. If one or more remaining tools report that the issue has been resolved, the orchestration system 110 may update the aggregate scan result.

The orchestration process may be automated. In one example, the orchestration system 110 may be plugged into one or more CI/CD tools 160 such that whenever code is checked in or a change is made to a particular software product, the orchestration system 110 may automatically initiate one or more SAST tools 130A-C, one or more DAST tools 140A-C or one or more OSA tools 150A-C to perform scan. Examples of the CI/CD tools 160 may include Jenkins™ and CircleCI™, among other possibilities.

In one example, the user may operate the orchestration system 110 through one or more external collectors 170. The external collectors 170 may communicate with the API 270 of the orchestration system 110. The external collectors 170 may include Hygieia™, an open source DevOps dashboard for visualizing a development pipeline.

In one example, the orchestration system 110 may rely on the graphical user interface 262 to interact with a user, such as receiving user inquiries, and providing information related to the software security analysis tools 120 and scan results to the user.

In one example, when the orchestration system 110 receives a scan request, for example, through the API 270, the orchestration system 110 may automatically trigger one or more software security analysis tools 120 of the same or different categories to start scans. The request may include a minimum level of information needed to selectively activate scan functions on the software security analysis tools 120. In some embodiments, the minimum level of information may be determined based on the selection of security analysis tools 120 accessible to orchestration system 110, as well as other product or enterprise considerations. The minimum level of information required of a scan request may thus be abstracted from various requirements and parameters of the various security analysis tools, so as to provide an efficient interface for user interaction.

In one example, the scan request received by the orchestration system 110 may include identification of code. The identification of code may include a directory indicating where the code is stored. Alternatively, the identification of code may include a zip code file. The scan request may identify the language in which the code is written, such as the primary language that the code is written in. The request may also include an identifier for which component within the system it belongs to. After receiving the scan request, the orchestration system 110 may send instructions to interfaces, such as APIs or command line utilities, of the various software security analysis tools 120. The various software security analysis tools 120 may be selectively determined based on the request and/or the code.

Some software security analysis tools 120 may require extra information beyond the scope of the scan request to start execution, such as a line count and secondary language of the code. Although such extra information is not present (or requested of a user) in the scan request received by the orchestration system 110, the orchestration system 110 may independently determine and provide such extra information to the software security analysis tools 120, without user intervention. As each software security analysis tool 120 is added to the orchestration system 110, the orchestration system 110 may store a requisite set of information to execute the software security analysis tool 120. Upon receiving a scan request, the orchestration system 110 may decide all necessary information that is needed to execute the software security analysis tool 120. For example, to scan a software project that contains specific code, a software security analysis tool 120 may require an identification of the code language to perform scan. The orchestration system 110 may independently, without user intervention, inspect the code, determine the code language, and provide the code language to the software security analysis tool 120.

Traditionally, when an organization wants to transition from one security tool to another, or swaps out one or more security tools, the organization may need to retool. Such efforts are saved by the orchestration system 110. With the orchestration system 110, backend tools may be added to or removed from the orchestration system 110 in a process transparent to the user or internal customer of the organization.

Figure 3:
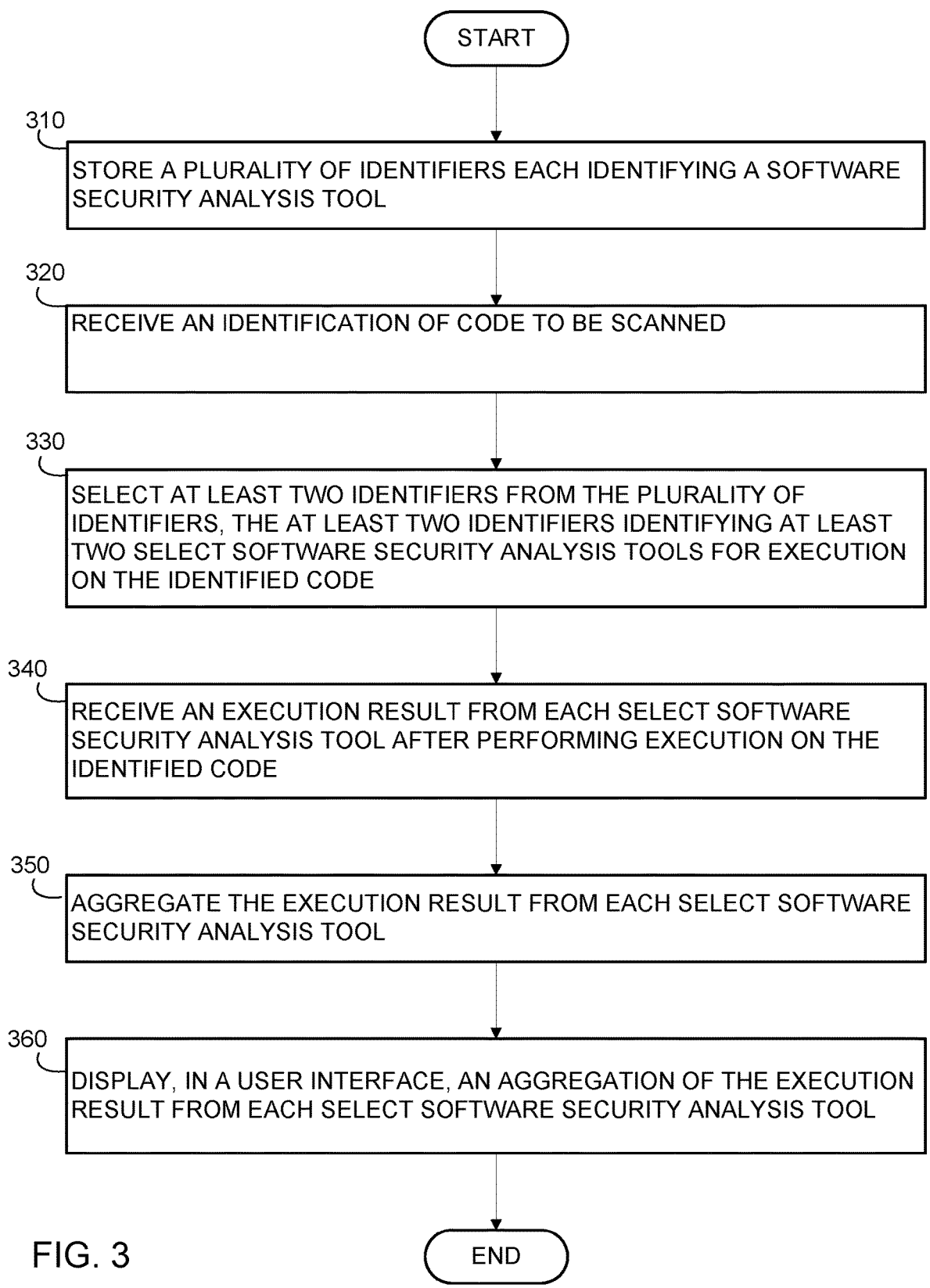
FIG. 3 is an example flow chart of a process performed by the orchestration system according to one aspect of the disclosed technology.

FIG. 3 illustrates an example flow chart of an orchestration process performed by the orchestration system 110. At 310, the non-transitory computer readable medium 220 may store a plurality of identifiers. Each identifier may identify a software security analysis tool 120. At 320, the processor 210 of the orchestration system 110 may receive an identification of code to be scanned. The identification of code may include a component name as registered in an application. Alternatively, or in addition, the identification of code may include a directory indicating where the code is stored in the system. At 330, the processor 210 may select at least two identifiers from the plurality of identifiers. The at least two identifiers may identify at least two select software security analysis tools 120 for execution on the identified code. The at least two select software security analysis tools may include at least two tools of different categories. Alternatively, the at least two select software security analysis tools may belong to the same category. The processor 210 may select the at least two identifiers from the plurality of identifiers based on configuration of the identified code. Alternatively, the processor 210 may select the at least two identifiers from the plurality of identifiers based on a user's selection provided via the graphical user interface 262.

At 340, the processor 210 may receive an execution result from each select software security analysis tool 120 after performing execution on the identified code. At 350, the processor 210 may aggregate the execution result from each select software security analysis tool 120.

At 350, the processor 210 may display, in the graphical user interface 262, an aggregation of the execution result from each select software security analysis tool 120. The processor 210 may display in a single view of the graphical user interface 262 the aggregation of the execution result from each select software security analysis tool 120. The graphical user interface 262 may display a selectable button to allow a user to configure each select software security analysis tool 120. The aggregation of the execution result from each select software security analysis tool displayed in the graphical user interface 262 may include a first score for a combined static analysis result, a second score for open source license analysis, and a third score for open source known vulnerabilities. The aggregation of the execution result from each select software security analysis tool 120 displayed in the graphical user interface 262 may include severity, category and name of the execution result.

Further, the processor 210 may monitor license status of each software security analysis tool 120 to determine whether a license renewal is required. The processor 210 may generate a license request when the license renewal is required. Some tools may be open source and free to use, whereas other tools may be purchased through a license. For instance, SAST tool 130A may have a limited usage license limiting access to a specified number of times, whereas SAST tool 130B may have an unlimited usage license. When the orchestration system 110 receives a scan request, the processor 210 may determine license situations of the tools. For example, if a project has over a million lines of code which merit additional licenses, the processor 210 may advise the user accordingly or proceed to acquire one or more licenses.

In one example, when the orchestration system 110 receives a scan request of a first software security analysis tool that requires a commercial license, the orchestration system 110 may advise the user to consider a second software security analysis tool with a free license that achieves similar scan purposes. If the commercial license is not preapproved, the orchestration system 110 may display and/or send a message to the user explaining why the first tool is not available.

The user may access the orchestration system 110 at any time to view license status of each software security analysis tool 120. For instance, for a software security analysis tool 120 that has a limited usage, the orchestration system 110 may store and display information indicating the current usage amount, such as 90% of capacity. Based on such information, the user may know if it is time to acquire additional licenses for that particular tool 120, or if it is time to review licenses that are already in use and see if some of them can be reclaimed. The orchestration system 110 allows the user to better monitor license status of software security analysis tools 120 at a system level as opposed to individual tool level. The user may easily determine the appropriate action based on the license status.

In one example, the processor 210 may compute one or more confidence scores for scan results produced by the software security analysis tools 120. The confidence scores may indicate accuracy of the scan results. In one example, the processor 210 may receive scan results from three SAST tools 130, where the first two tools identify a same issue, and the third tool does not. The processor 210 may determine a quality of the scan results based on what tools found the issue. The processor 210 may compare each confidence score to a predetermined threshold. When the computed confidence score is lower than the predetermined threshold, such as 80%, the scan result or finding may be deemed false positive or non-real. When the computed confidence score meets the predetermined threshold, the scan result or finding may be deemed real. In one example, the graphical user interface 262 of the orchestration system 110 may only show scan results or findings that are deemed real.

The orchestration system 110 may orchestrate multiple scans, combine those results in a way and generate confidence scores that allow the user to decide whether that result is a true positive, false positive, or what other combinations of those. By doing so, the orchestration system 110 may provide a more accurate and complete result than what an individual tool would produce. In some examples, a user may designate a scan result or a finding returned by a software security analysis tool 120 as "false positive". In one example, the processor 210 may identify a "false positive" scan result. The processor 210 may subsequently instruct at least one software security analysis tool 120 to perform additional scans to validate the "false positive" scan result.

The orchestration system 110 may use a fingerprint approach to determine correlation or similarity among scan results or findings generated by different software security analysis tools 120. The fingerprint approach may be associated with line position, contents, CWE and other identifying factors, to determine whether two scan results produced by two different software security analysis tools 120 are the same. The fingerprint approach remains robust regardless whether the code position, line or content changes in subsequent scans.

Figure 4:
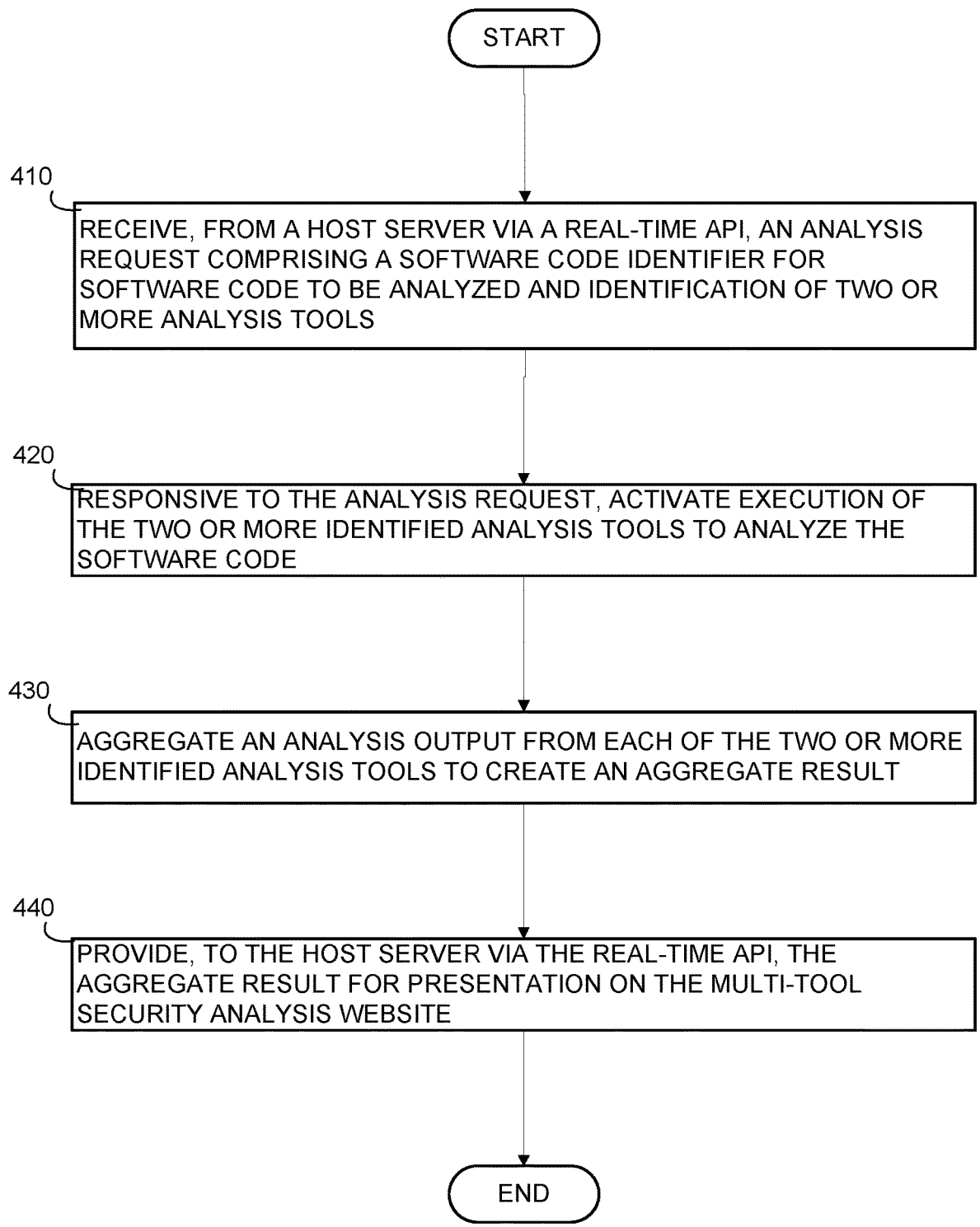
FIG. 4 is an example flow chart of another process performed by the orchestration system according to one aspect of the disclosed technology.

FIG. 4 illustrates another example flow chart of an orchestration process performed by the orchestration system 110. At 410, the processor 210 of the orchestration system 110 may receive, from the host server 190, via the API 270, an analysis request comprising a software code identifier for software code to be analyzed and identification of two or more analysis tools 120 comprising one or more SAST tools 130, one or more DAST tools 140, and one or more OSA tools 150. The API 270 may be a real-time API. The analysis tools 120 may be presented on a multi-tool security analysis website associated with the host server 180. The software code identifier may include a directory indicating a storage location of the software code. The software code identifier may include at least a portion of the software code.

At 420, responsive to the analysis request, the processor 210 may activate execution of the two or more identified analysis tools 120 to analyze the software code. At 430, the processor 210 may aggregate an analysis output from each of the two or more identified analysis tools 120 to create an aggregate result. The aggregate result may include an indication of a severity, a category, a name, and a confidence score for each of a plurality of identified vulnerabilities. The aggregate result may include a first score for a combined static analysis result, a second score for open source license analysis, and a third score for open source known vulnerabilities. At 440, the processor 210 may provide to the host server 180 via the real-time API 270 the aggregate result for presentation on the multi-tool security analysis website.

Additionally, the processor 210 may track a license status for each of the analysis tools 120 presented on the multi-tool security analysis website. The processor 210 may determine whether each of the two or more identified analysis tools 120 require a license renewal based on their license statuses. The processor 210 may determine that at least a first tool of the two or more identified analysis tools 120 requires a license renewal. The processor 210 may send a license renewal request to a tool licensor server to renew the license of at least the first tool.

The processor 210 may receive, from the host server 180 via the real-time API 270, user-inputted configuration settings corresponding to at least one of the two or more identified analysis tools 120. The processor 210 may configure the at least one of the two or more identified analysis tools 120 based on the user-inputted configuration settings.

Figure 5:
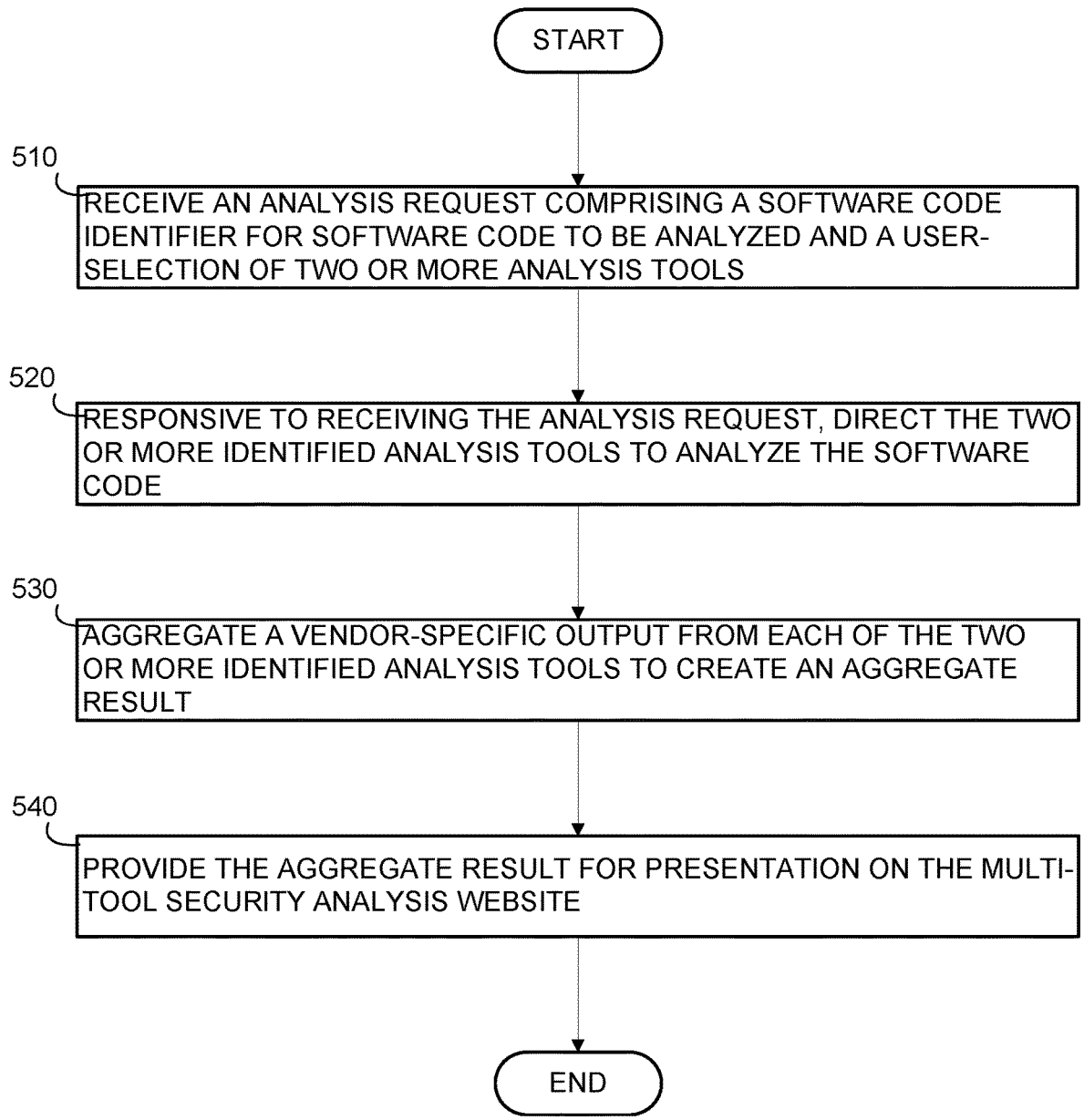
FIG. 5 is an example flow chart of yet another process performed by the orchestration system according to one aspect of the disclosed technology.

FIG. 5 illustrates another example flow chart of an orchestration process performed by the orchestration system 110. At 510, the processor 210 of the orchestration system 110 may receive an analysis request comprising a software code identifier for software code to be analyzed and a user-selection of two or more analysis tools 120 comprising one or more SAST tools 130, one or more DAST tools 140, and one or more OSA tools 150. The analysis tools 120 are presented on a multi-tool security analysis web site. The web site may be an internal page/site associated with an enterprise, or a publicly accessible website.

At 520, responsive to receiving the analysis request, the processor 210 may direct the two or more identified analysis tools 120 to analyze the software code. At 530, the processor 210 may aggregate a vendor-specific output from each of the two or more identified analysis tools 120 to create an aggregate result. At 540, the processor 210 may provide the aggregate result for presentation on the multi-tool security analysis website.

Turning back to FIG. 2, each orchestration system 110 may include one or more physical or logical devices (e.g., servers). For example, the orchestration system 110 may be a single device or server or may be configured as a distributed computer system including multiple servers, devices, or computers that interoperate to perform one or more of the processes and functionalities associated with the disclosed embodiments. In some embodiments, the orchestration system 110 may further include a peripheral interface, a transceiver, a mobile network interface in communication with the processor 210, a bus configured to facilitate communication between the various components of the orchestration system 110, and a power source configured to power one or more components of the orchestration system 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory computer readable medium 220 may contain an operating system ("OS") 222 and a program 224. The non-transitory computer readable medium 220 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 220. The non-transitory computer readable medium 220 may include one or more memory devices that store data and instructions used to perform one or more features of the disclosed embodiments. The non-transitory computer readable medium 220 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 220 may include software components that, when executed by the processor 210, perform one or more processes consistent with the disclosed embodiments. In some embodiments, the non-transitory computer readable medium 220 may include a database 224 to perform one or more of the processes and functionalities associated with the disclosed embodiments. The non-transitory computer readable medium 220 may include one or more programs 226 to perform one or more functions of the disclosed embodiments. Moreover, the processor 210 may execute one or more programs 226 located remotely from the orchestration system 110. For example, the orchestration system 110 may access one or more remote programs 226, that, when executed, perform functions related to disclosed embodiments.

The orchestration system 110 may also include one or more I/O devices 260 that may comprise one or more interfaces for receiving signals or input from devices and providing signals or output to one or more devices that allow data to be received and/or transmitted by the orchestration system 110. For example, the orchestration system 110 may include interface components, which may provide interfaces to one or more input devices, such as one or more keyboards, mouse devices, touch screens, track pads, trackballs, scroll wheels, digital cameras, microphones, sensors, and the like, that enable the orchestration system 110 to receive data from one or more users. The orchestration system 110 may include a display, a screen, a touchpad, or the like for displaying images, videos, data, or other information. The I/O devices 260 may include the graphical user interface 262.

In exemplary embodiments of the disclosed technology, the orchestration system 110 may include any number of hardware and/or software applications that are executed to facilitate any of the operations. The one or more I/O interfaces 260 may be utilized to receive or collect data and/or user instructions from a wide variety of input devices. Received data may be processed by one or more computer processors as desired in various implementations of the disclosed technology and/or stored in one or more memory devices.

Turning back to FIG. 1, the networks 180 may include a network of interconnected computing devices more commonly referred to as the internet. The network 180 may be of any suitable type, including individual connections via the internet such as cellular or WiFi networks. In some embodiments, the network 180 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 180 may comprise any type of computer networking arrangement used to exchange data. For example, the network 180 may be the Internet, a private data network, virtual private network using a public network, and/or other suitable connection(s) that enables components in system environment 100 to send and receive information between the components of system 100. The network 180 may also include a public switched telephone network ("PSTN") and/or a wireless network. The network 180 may also include local network that comprises any type of computer networking arrangement used to exchange data in a localized area, such as WiFi, Bluetooth™ Ethernet, and other suitable network connections that enable components of system environment 100 to interact with one another.

According to some embodiments, the host server 190 may host websites, web portal or software application, data or software applications that may access and interact with the orchestration system 110.

Exemplary Use Cases

The following example use case describes examples of orchestration implementations. This is intended solely for explanatory purposes and not limitation.

FIG. 6 illustrates a screenshot 600 for operating the orchestration system 110 to perform SAST scans and OSA scans of application code. As shown in FIG. 6, by sending a request to the pictured "/assessment/static" endpoint, backend scans may be orchestrated for all (or a subset of) enabled SAST tools 130 such as Fortify on Demand™ and Checkmarx™, and all enabled (or a subset of) OSA tools 150 such as Whitesource™. The simplified interface shown in the screenshot 600 has two required inputs and two optional inputs (the remaining parameters and configurations etc.

being handled automatically by orchestration system 110), significantly lower than most individual tool integrations. The orchestration system 110 handles the rest of the required integration with various tools 120 behind the scenes, the required and optional inputs having been abstracted out for ease of use of the user.

Figure 7:
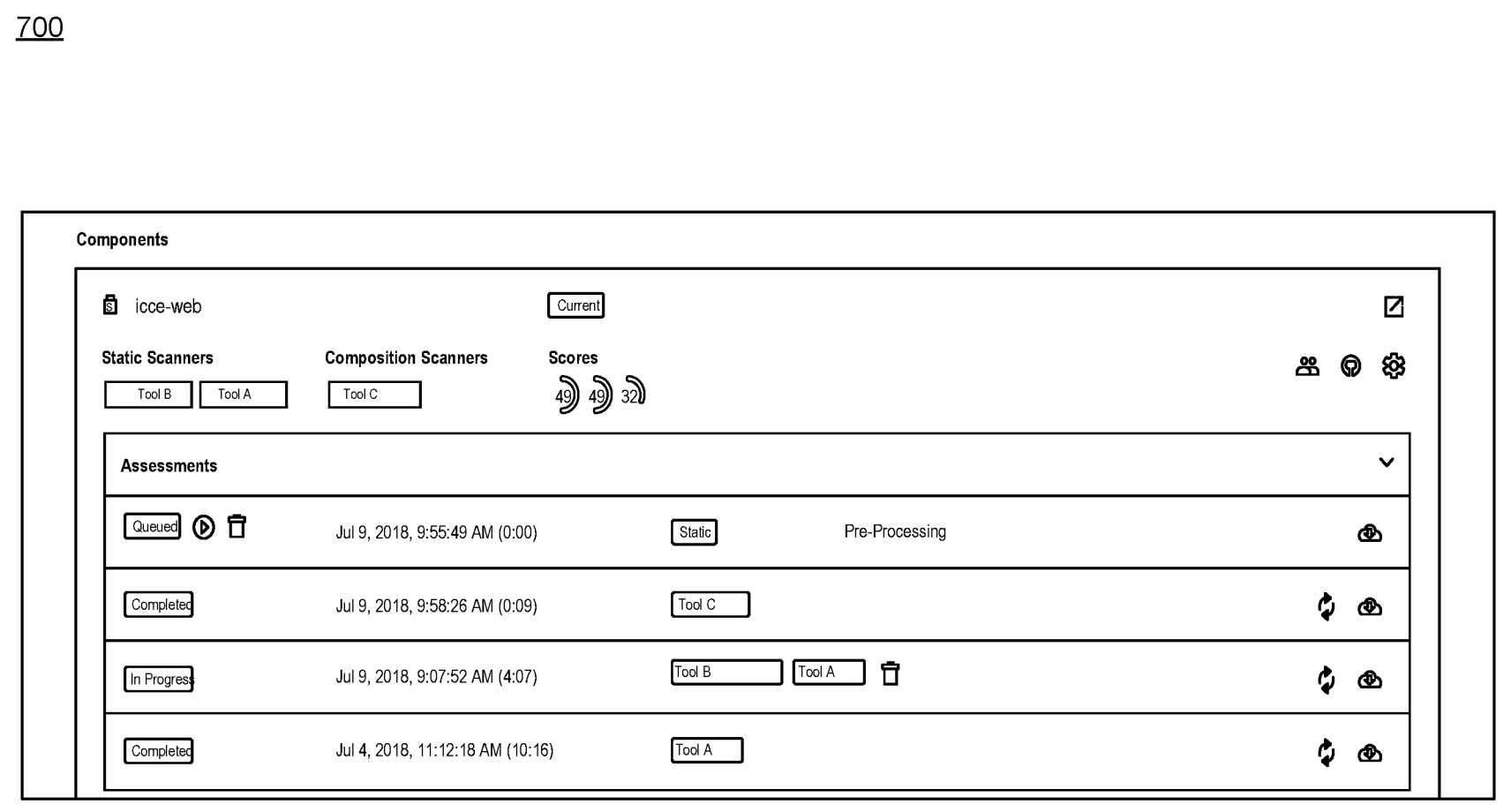

FIG. 7 illustrates a screenshot 700 of the graphical user interface 262 of the orchestration system 110, according to an example implementation. FIG. 7 illustrates a few elements of the orchestration process. The screenshot 700 depicts a view in the orchestration system 110 for a given application or component showing its scan history. Events are shown sorted in an order from newest to oldest. The oldest event shows a "Completed" assessment where a single scan performed by tool A was run. Thereafter, the screenshot 700 also shows another assessment where two scans performed by tool A and tool B are in progress. In parallel to those scans, another assessment shows a scan performed by tool C with a "Completed" status. For example, tool A may refer to Checkmarx™, tool B may refer to Fortify on Demand™, and tool C may refer to White-Source™. Lastly, an additional request, listed as "Queued," is on hold until the scans that are currently in progress have completed.

The orchestration system 110 monitors scan statuses of all tools 120 from start to completion. Once all scans of an assessment have completed, the assessment is marked as "Completed." Upon assessment completion, individual scan results of each tool 120 may be combined into a unified finding view and presented by the orchestration system 110.

The screenshot 700 also shows the ability for admins to configure specific scanners. This may be automatically done as components are enrolled, but can be overridden by admins. As shown in FIG. 7, next to that configuration, scores are shown. This set of three scores are outcomes of most scan recent results. The first score represents a combined static analysis result. The second score represents a combined open source license analysis. The third score represents open source known vulnerabilities.

Figure 8:
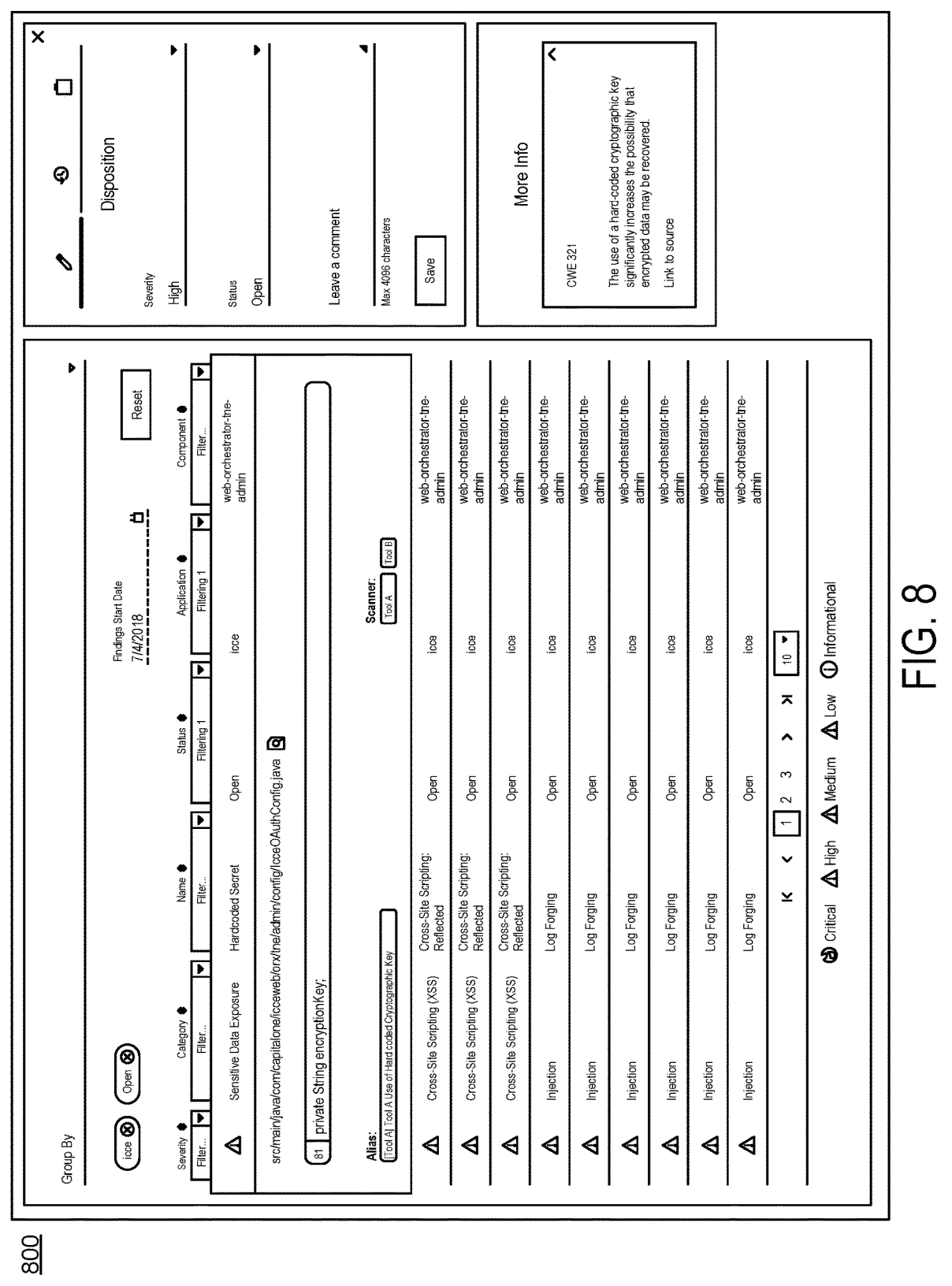

FIG. 8 illustrates a screenshot 800 of the example graphical user interface 262 of the orchestration system 110, according to an example implementation. The screenshot 800 shows scan results or findings after each scan has finished. These scan results or findings are an aggregate scan result of multiple software security analysis tools 120. As shown in the screenshot 800, the first scan result or finding (e.g., a sensitive data exposure—hardcoded secret) was found by two software security analysis tools: tool A and tool B. For examples, tool A may refer to Checkmarx™, and tool B may refer to Fortify on Demand™ (FOD). The shown results are filterable based on a category and name assigned to each result or finding. In some embodiments, the category and name may be based on a common internal taxonomy that may not directly correspond to a finding output by any one or more tools. For example, the orchestration system 110 may unify various common fields, such as severity, category, and name to common internal taxonomy, rather than relying on CWE or some other external way to link them. The screenshot 800 illustrates a disposition side-bar where users may dispose findings, where disposition is handled across tools and across assessments/scans.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for performing code security scan, comprising:

a non-transitory computer readable medium storing:
  a plurality of identifiers each identifying a software security analysis tool, the plurality of identifiers comprising:
    a first identifier identifying a first software security analysis tool of a first category for performing Static Application Security Testing (SAST);
    a second identifier identifying a second software security analysis tool of a second category for performing Dynamic Application Security Testing (DAST); and
    a third identifier identifying a third software security analysis tool of a third category for performing Open Source Analysis (OSA); and
a processor configured to:
  receive code to be scanned;
  select at least two identifiers from the plurality of identifiers, each of the at least two identifiers identifying a software security analysis tool from a different category for execution on the code;
  determine that a license status is expired for a first software security analysis tool of the at least two software security analysis tools;
  generate a license renewal request for the first software security analysis tool;
  send, to a licensor of the first software security analysis tool, the license renewal request;
  receive, from the licensor, a license renewal for the first software security analysis tool;
  update the license status for the first software security analysis tool to a renewed license status;
  analyze the code to be scanned with the at least two software security analysis tools;
  receive a result from each of the at least two software security analysis tools;
  aggregate the result from each of the at least two software security analysis tools; and
  display, in a user interface, the aggregation of the result from each of the at least two software security analysis tools.

2. The system of claim 1, wherein the of code includes a component name as registered in an application.

3. The system of claim 1, wherein the of code includes a directory indicating where the code is stored in the system.

4. The system of claim 1, wherein each software security analysis tool of the first, second and third categories is a standalone solution, a network-based client-server solution, a web-based solution, or a cloud-based solution.

5. The system of claim 1, wherein the aggregation of the result from each of the at least two software security analysis tools displayed in the user interface comprises a severity, a category, and a name of the result.

6. The system of claim 1, wherein the processor is configured to identify a "false positive" result, and to subsequently instruct one of the first, the second, and the third software security analysis tools to perform a security scan on the identified code.

7. The system of claim 1, wherein the user interface further displays a selectable button to allow a user to configure each software security analysis tool.

8. The system of claim 1, wherein the aggregation of the result from each software security analysis tool displayed in the user interface further comprises a first score for a combined static analysis result, a second score for open source license analysis, and a third score for open source known vulnerabilities.

9. The system of claim 1, wherein the non-transitory computer readable medium stores information of historical scan activity performed by each software security analysis tool for display in the user interface upon request.

10. The system of claim 1, wherein the non-transitory computer readable medium stores status information of execution progress for each software security analysis tool for display in the user interface upon request, the status information comprising one of the following: completed, in progress, and queued.

11. The system of claim 1, wherein the processor is configured to compute a confidence score.

12. The system of claim 1, wherein the processor is configured to select the at least two identifiers from the plurality of identifiers based on a configuration of the code.

13. The system of claim 1, wherein the processor is configured to select the at least two identifiers from the plurality of identifiers based on a user's selection provided via the user interface.

14. A multi-tool security analysis system comprising:
one or more processors; and
a memory in communication with the one or more processors and storing:
  a plurality of identifiers each identifying a software security analysis tool, the plurality of identifiers comprising:
    a first identifier identifying a first software security analysis tool of a first category for performing Static Application Security Testing (SAST);
    a second identifier identifying a second software security analysis tool of a second category for performing Dynamic Application Security Testing (DAST); and
    a third identifier identifying a third software security analysis tool of a third category for performing Open Source Analysis (OSA);
  wherein the software security analysis tools are presented on a multi-tool security analysis website associated with a host server, and
wherein the memory stores instructions that, when executed by the one or more processors, are configured to cause the system to:
  receive, from the host server via a real-time application programming interface (API), an analysis request comprising code to be analyzed and at least two identifiers from the plurality of identifiers, the at least two identifiers identifying two or more software security analysis tools from two categories for execution on the software code;
  determine that a license status is expired for a first software security analysis tool of the two or more software security analysis tools;
  generate a license renewal request for the first software security analysis tool;
  send, to a licensor of the first software security analysis tool, the license renewal request;
  receive, from the licensor, a license renewal for the first software security analysis tool;
  update the license status for the first software security analysis tool to a renewed license status;
  analyze, with an execution of the two or more software security analysis tools, the code;
  aggregate an analysis output from each of the two or more software security analysis tools to create an aggregate result; and provide, to the host server via the real-time API, the aggregate result for a presentation on the multi-tool security analysis website.

15. The system of claim 14, wherein the analysis request further comprising a software code identifier; and
wherein the software code identifier comprises a directory indicating a storage location of the code.

16. The system of claim 14, wherein the aggregate result comprises an indication of a severity, a category, a name, and a confidence score for each of a plurality of identified vulnerabilities.

17. The system of claim 14, wherein the instructions are further configured to cause the system to:
receive, from the host server via the real-time API, user-inputted configuration settings corresponding to at least one of the two or more software security analysis tools; and
configure the at least one of the two or more software security analysis tools based on the user-inputted configuration settings.

18. The system of claim 14, wherein the aggregate result comprises a first score for a combined static analysis result, a second score for open source license analysis, and a third score for open source known vulnerabilities.

19. A multi-tool security analysis system comprising:
one or more processors; and
a memory in communication with the one or more processors and storing:
a plurality of identifiers each identifying a software security analysis tool, the plurality of identifiers comprising:
a first identifier identifying a first software security analysis tool of a first category for performing Static Application Security Testing (SAST);
a second identifier identifying a second software security analysis tool of a second category for performing Dynamic Application Security Testing (DAST); and
a third identifier identifying a third software security analysis tool of a third category for performing Open Source Analysis (OSA);
wherein the software security analysis tools are presented on a multi-tool security analysis website, and instructions that, when executed by the one or more processors, are configured to cause the system to:
receive an analysis request comprising a software code identifier for software code to be analyzed and at least two identifiers from the plurality of identifiers, the at least two identifiers identifying at least two software security analysis tools from two categories for execution on the software code;
determine that a license status is expired for a first software security analysis tool of the at least two software security analysis tools;
generate a license renewal request for the first software security analysis tool;
send, to a licensor of the first software security analysis tool, the license renewal request;
receive, from the licensor, a license renewal for the first software security analysis tool;
update the license status for the first software security analysis tool to a renewed license status;
analyze, with the at least two software security analysis tools, the software code;
aggregate a vendor-specific output from each of the at least two software security analysis tools to create an aggregate result; and
provide the aggregate result for presentation on the multi-tool security analysis website.

\* \* \* \* \*